United States Patent
Eden et al.

(10) Patent No.: US 9,464,563 B2
(45) Date of Patent: Oct. 11, 2016

(54) TURBOCHARGER WASTEGATE AND METHOD FOR OPERATION OF A TURBOCHARGER WASTEGATE

(71) Applicant: Ford Global Technologies, LLC, Dearborn, MI (US)

(72) Inventors: Alan Eden, Canton, MI (US); Anthony Morelli, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 583 days.

(21) Appl. No.: 13/706,252

(22) Filed: Dec. 5, 2012

(65) Prior Publication Data
US 2014/0150424 A1 Jun. 5, 2014

(51) Int. Cl.
*F02D 23/00* (2006.01)
*F02B 33/44* (2006.01)
*F02B 37/18* (2006.01)
*F02B 39/16* (2006.01)

(52) U.S. Cl.
CPC .............. *F02B 33/44* (2013.01); *F02B 37/183* (2013.01); *F02B 39/16* (2013.01); *Y02T 10/144* (2013.01)

(58) Field of Classification Search
CPC ...... F02B 33/44; F02B 39/16; F02B 37/183; F02B 37/18; Y02T 10/144
See application file for complete search history.

(56) References Cited

U.S. PATENT DOCUMENTS

| | | | |
|---|---|---|---|
| 3,580,238 A * | 5/1971 | Diehl | F24H 9/2007 110/163 |
| 4,463,564 A * | 8/1984 | McInerney | F01D 17/105 137/892 |
| 4,623,000 A * | 11/1986 | Knapp | F16K 11/0782 137/625.17 |
| 4,932,428 A | 6/1990 | Planchard et al. | |
| 5,146,753 A * | 9/1992 | Potter | F02B 37/186 415/146 |
| 5,205,125 A * | 4/1993 | Potter | F02B 37/186 137/527 |
| 5,214,919 A * | 6/1993 | Jiewertz | F02B 37/12 60/602 |
| 5,221,360 A * | 6/1993 | Thompson | B08B 3/02 134/153 |
| 6,176,347 B1 | 1/2001 | Chae et al. | |
| 6,810,667 B2 | 11/2004 | Jung et al. | |
| 6,983,596 B2 | 1/2006 | Frankenstein et al. | |
| 7,823,385 B2 | 11/2010 | McEwen et al. | |
| 7,823,825 B2 | 11/2010 | Genta et al. | |
| 7,926,270 B2 | 4/2011 | Weaver et al. | |
| 8,096,754 B2 * | 1/2012 | Naemura et al. | 415/144 |
| 8,166,756 B2 | 5/2012 | Chen et al. | |
| 8,206,133 B2 * | 6/2012 | Mudel | F01D 25/243 417/406 |
| 8,740,578 B2 * | 6/2014 | Kamecke | F04C 18/126 417/310 |
| 9,011,086 B2 * | 4/2015 | Herrera Celaya | F02B 37/183 29/889.2 |
| 2011/0005222 A1 * | 1/2011 | Hayashi et al. | 60/602 |
| 2011/0008158 A1 * | 1/2011 | Boening | F01D 25/24 415/200 |
| 2011/0126537 A1 * | 6/2011 | Yoshimoto et al. | 60/614 |
| 2012/0055154 A1 * | 3/2012 | Ebert | F01D 17/105 60/602 |
| 2013/0139502 A1 * | 6/2013 | Chu | 60/602 |

FOREIGN PATENT DOCUMENTS

| | | | | |
|---|---|---|---|---|
| DE | 202011108044 U1 * | 1/2012 | ............ | F16L 59/024 |
| FR | WO 2010104695 A2 * | 9/2010 | ........... | F01D 17/105 |

* cited by examiner

*Primary Examiner* — Thai Ba Trieu
*Assistant Examiner* — Shafiq Mian
(74) *Attorney, Agent, or Firm* — Julia Voutyras; Alleman Hall McCoy Russell & Tuttle LLP

(57) ABSTRACT

A turbocharger wastegate is provided. The turbocharger wastegate comprises a cover plate actuatable in an open and closed position, the open position enabling exhaust gas flow through a turbine bypass conduit and the closed position inhibiting exhaust gas flow through the turbine bypass conduit and a vibration-dampening extension coupled to the cover plate radially extending beyond a radial periphery of the cover plate. Exhaust gas flow acting on the extension thus reduces vibration of the wastegate, thereby improving durability and reducing unwanted noise.

19 Claims, 4 Drawing Sheets

TURBOCHARGER WASTEGATE AND METHOD FOR OPERATION OF A TURBOCHARGER WASTEGATE

FIELD

The present disclosure relates to a turbocharger wastegate in an engine and a method for operation of a turbocharger wastegate.

BACKGROUND AND SUMMARY

Turbochargers are used in engines to provide boost for increased engine power output or for enabling a downsized engine to produce an equivalent amount of power as a larger naturally aspirated engine. However, it may be desirable to adjust the amount of boost provided to the engine during certain operating conditions. Therefore, turbocharger wastegates positioned in turbine bypasses have been developed to enable boost adjustment in the engine.

U.S. Pat. No. 7,823,825 discloses a mechanical linkage coupling a solenoid to a wastegate. The mechanical linkage is provided with a flexible rod enabling a greater range in opening pressures of the wastegate to simplify wastegate set-up and calibration.

However, the inventors have recognized several drawbacks with the wastegate disclosed in U.S. Pat. No. 7,823,825. Due to the high speed of the exhaust gases and the turbulent flow patterns around the wastegate valve, the wastegate valve may experience unwanted audible vibrations, referred to as wastegate chatter. The noises may be unpleasant to the vehicle operator and the vibration may decrease the longevity of the wastegate. As a result, customer satisfaction and turbocharger reliability are decreased.

The inventors herein have recognized the above issues and developed a turbocharger wastegate that includes a cover plate actuatable in an open and closed position, the open position enabling exhaust gas flow through a turbine bypass conduit and the closed position inhibiting exhaust gas flow through the turbine bypass conduit. A vibration-dampening extension is coupled to the cover plate radially extending beyond a radial periphery of the cover plate.

It has been unexpectedly found that a side-force imparted on the cover plate via the vibration-dampening extension reduces vibration of the wastegate during operation. As a result, customer satisfaction and turbocharger longevity are increased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

A vibration-dampening extension in a turbocharger wastegate is disclosed herein. The vibration-dampening extension is coupled to and extends radially beyond a cover plate actuatable in an open position where exhaust gas is permitted to bypass the turbine and a closed position where exhaust gas is inhibited from bypassing the turbine. The vibration-dampening extension may extend into an exhaust gas flow in the turbocharger system, thereby loading the cover plate with a side-force. The side-force reduces wastegate vibration (e.g., chatter), thereby increasing customer satisfaction and wastegate longevity. Specifically, the resultant force is imparted on the wastegate valve off-center from its natural pivot point. The resultant force biases the wastegate valve within its clearances introducing a friction resistance to oscillating vibrations, thus reducing (e.g., eliminating) the audible vibrations within the wastegate particularly in a slightly open valve position.

Figure 1:
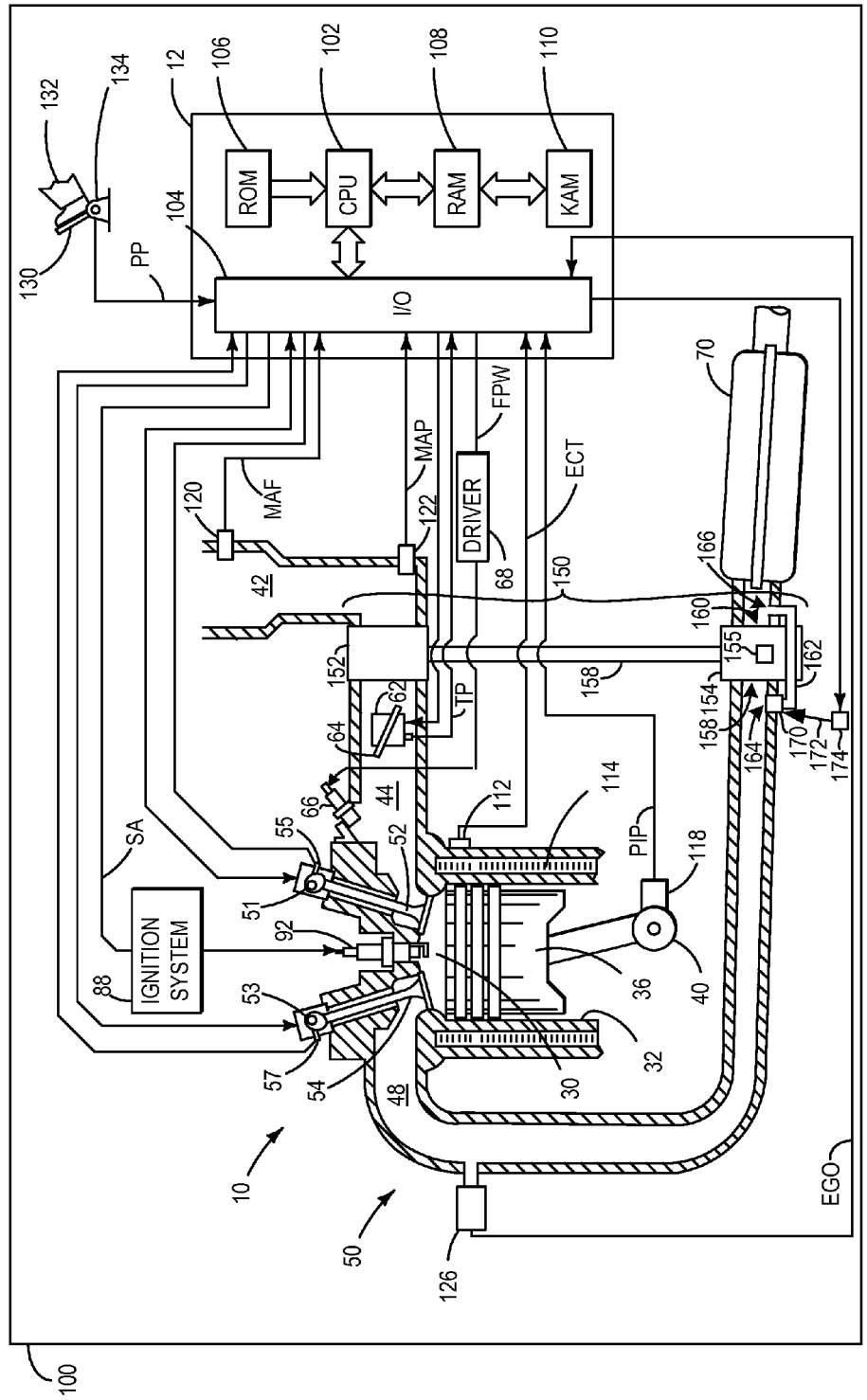
FIG. 1 shows a schematic depiction of an engine including a turbocharger system.
Figure 2:
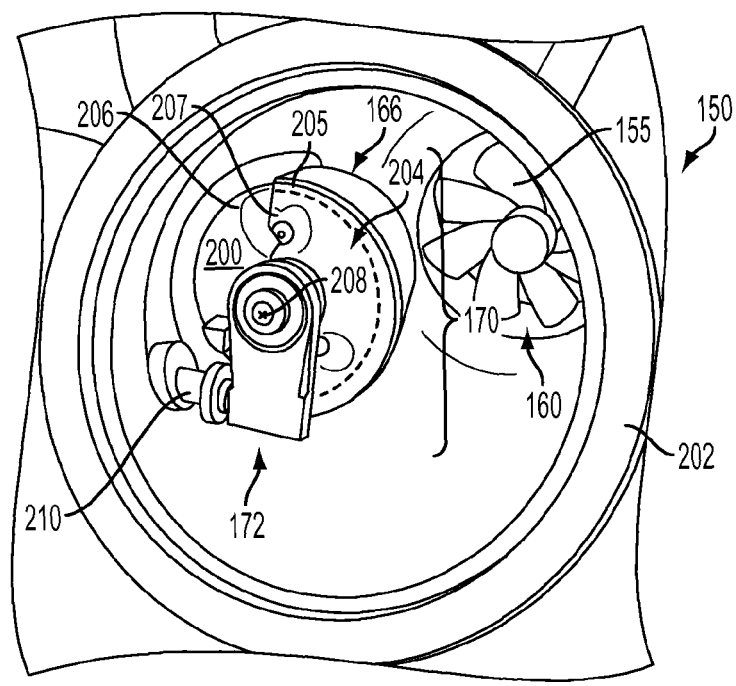
FIGS. 2-4 show various views of an example turbocharger system including a turbocharger wastegate being drawn approximately to scale, however other relative dimensions may be used if desired.
Figure 3:
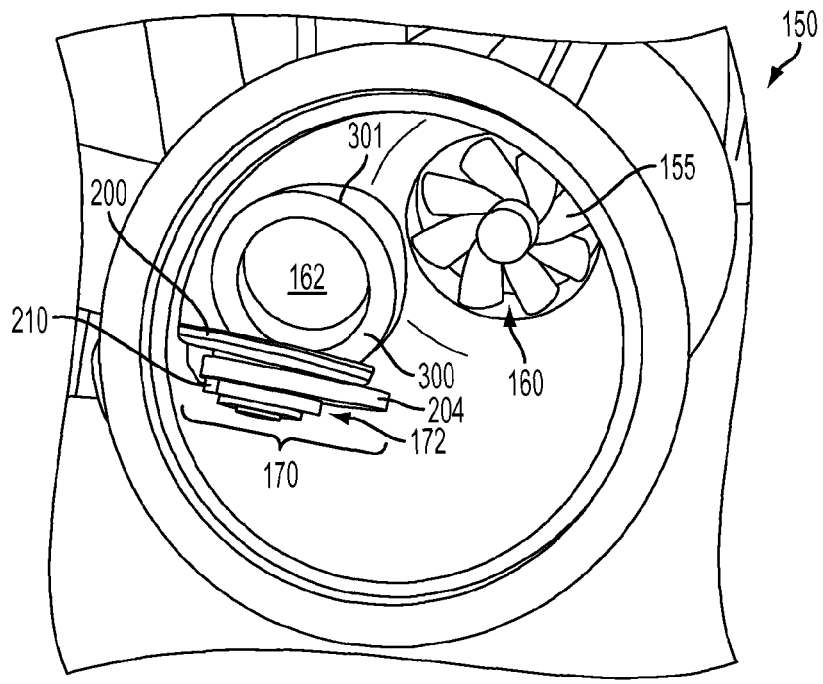
Figure 4:
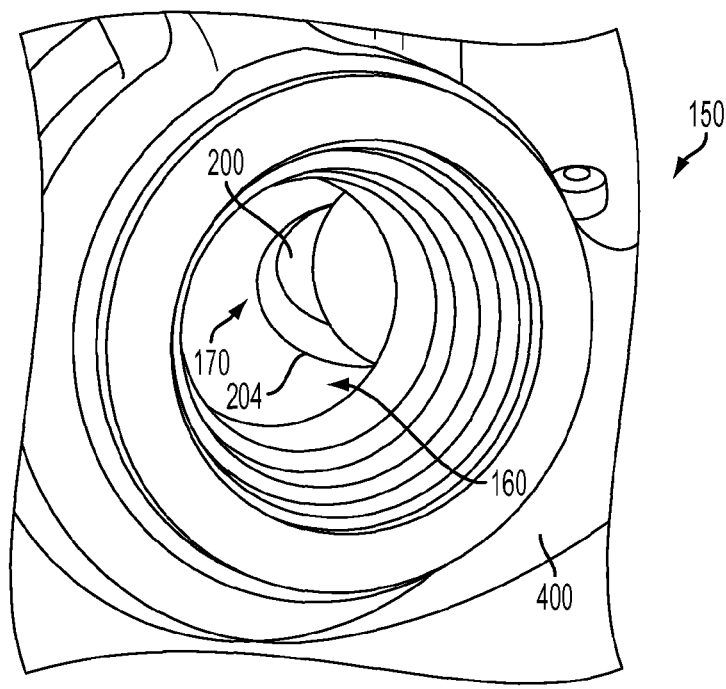
Figure 5:
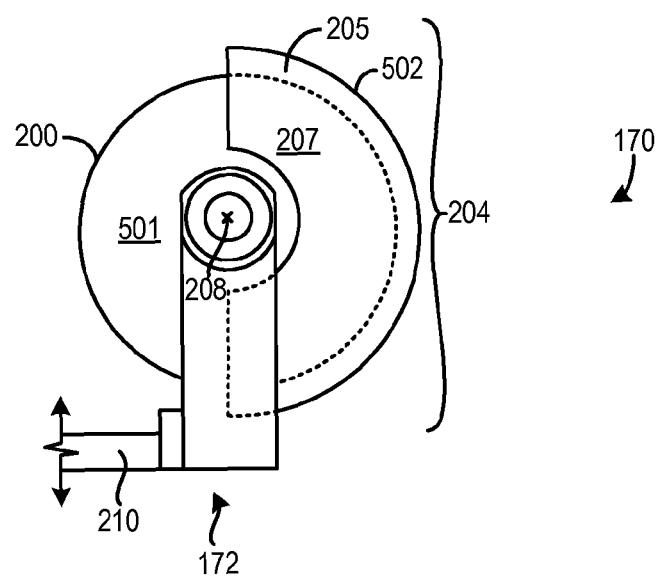
FIG. 5 shows an example turbocharger wastegate.
Figure 6:
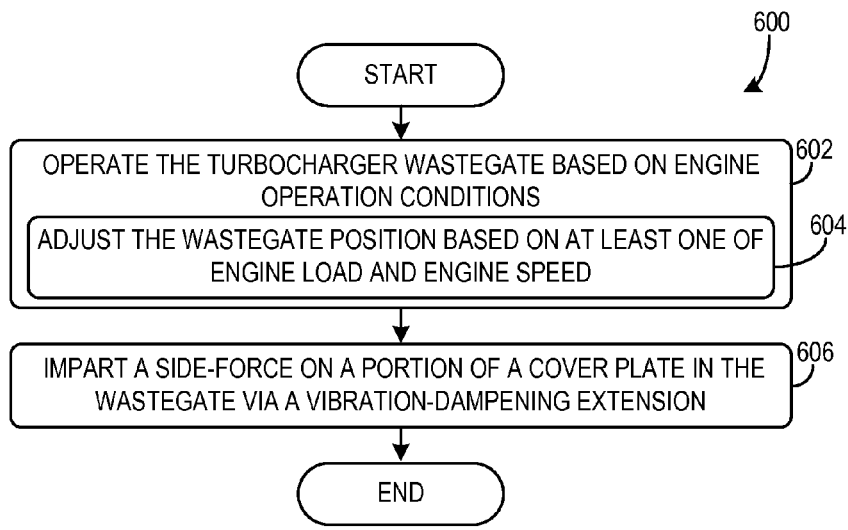
FIG. 6 shows a method for operation of a turbocharger wastegate.

FIG. 1 shows a schematic depiction of an engine including a turbocharger system 150 having a turbocharger wastegate. FIGS. 2-4 show various views of an example turbocharger system and wastegate. FIG. 5 shows an example turbocharger wastegate. FIG. 6 shows a method for operation of the turbocharger wastegate.

FIG. 1 is a schematic diagram showing one cylinder of multi-cylinder engine 10, which may be included in a propulsion system of a vehicle 100 in which an exhaust gas sensor 126 (e.g., air-fuel sensor) may be utilized to determine an air fuel ratio of exhaust gas produce by engine 10. The air fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Cylinder (i.e., combustion chamber) 30 of engine 10 may include combustion chamber walls 32 with piston 36 positioned therein.

Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Cylinder 30 may receive intake air from intake manifold 44 via intake passage 42 and may exhaust combustion gases via exhaust passage 48. The intake manifold 44 may include an intake manifold, in some examples. Intake manifold 44 and exhaust passage 48 can selectively communicate with cylinder 30 via respective intake valve 52 and exhaust valve 54. In some embodiments, cylinder 30 may include two or more intake valves and/or two or more exhaust valves. A throttle 62 including a throttle plate 64 is positioned in the intake passage 42. The throttle is configured to adjust the amount of airflow flowing to the cylinder 30.

In this example, intake valve 52 and exhaust valves 54 may be actuated via an intake cam 51 and an exhaust cam 53. In some examples, the engine 10 may include a variable cam timing system configured to adjust (advance or retard) cam timing. The position of intake valve 52 and exhaust valve 54 may be determined by position sensors 55 and 57, respectively.

Fuel injector 66 is shown arranged in intake manifold 44 in a configuration that provides what is known as port injection of fuel into the intake port upstream of cylinder 30. Fuel injector 66 may inject fuel in proportion to the pulse width of signal FPW received from controller 12 via electronic driver 68. In some examples, cylinder 30 may alternatively or additionally include a fuel injector coupled directly to cylinder 30 for injecting fuel directly therein, in a manner known as direct injection.

Ignition system 88 can provide an ignition spark to cylinder 30 via spark plug 92 in response to spark advance signal SA from controller 12, under select operating modes. Though spark ignition components are shown, in some examples, cylinder 30 or one or more other combustion chambers of engine 10 may be operated in a compression ignition mode, with or without an ignition spark.

Exhaust gas sensor 126 is shown coupled to exhaust passage 48 of exhaust system 50 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some examples, exhaust gas sensor 126 may be a first one of a plurality of exhaust gas sensors positioned in the exhaust system. For example, additional exhaust gas sensors may be positioned downstream of emission control device 70.

Emission control device 70 is shown arranged along exhaust passage 48 downstream of exhaust gas sensor 126. Emission control device 70 may be a three way catalyst (TWC), NOx trap, various other emission control devices, or combinations thereof. In some examples, emission control device 70 may be a first one of a plurality of emission control devices positioned in the exhaust system. In some examples, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory 106 (e.g., memory chip) in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

During operation, the cylinder 30 in the engine 10 typically undergoes a four stroke cycle: the cycle includes the intake stroke, compression stroke, expansion stroke, and exhaust stroke. In a multi-cylinder engine the four stroke cycle may be carried out in additional combustion chambers. During the intake stroke, generally, exhaust valve 54 closes and intake valve 52 opens. Air is introduced into cylinder 30 via an intake manifold, for example, and piston 36 moves to the bottom of the combustion chamber so as to increase the volume within cylinder 30. The position at which piston 36 is near the bottom of the combustion chamber and at the end of its stroke (e.g. when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g. when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as a spark plug 92, resulting in combustion. Additionally or alternatively compression may be used to ignite the air/fuel mixture. During the expansion stroke, the expanding gases push piston 36 back to BDC. A crankshaft may convert piston movement into a rotational torque of the rotary shaft. Finally, during the exhaust stroke, exhaust valve 54 opens to release the combusted air-fuel mixture to an exhaust manifold and the piston returns to TDC. Note that the above is described merely as an example, and that intake and exhaust valve opening and/or closing timings may vary, such as to provide positive or negative valve overlap, late intake valve closing, or various other examples. Additionally or alternatively compression ignition may be implemented in the cylinder 30.

FIG. 1 also shows a turbocharger system 150 including a compressor 152 and a turbine 154. The turbocharger is generically depicted. However, it will be appreciated that the turbocharger system has additional complexity that is described in greater detail herein with regard to FIGS. 2-4.

The compressor 152 is positioned in the intake passage 42 and configured to increase the pressure of the intake air, thereby providing boost to the engine 10. A shaft 156 or other suitable mechanical linkage couples the compressor 152 to a turbine 154. In this way, rotational motion generated in the turbine may be transferred to the compressor. The turbine 154 includes an inlet 158 configured to receive exhaust gas from the exhaust passage 48. The turbine 154 further includes an outlet 160 configured to flow exhaust gas downstream of the turbine to components such as the emission control device 70. However, it will be appreciated that in other examples the emissions control device may be positioned upstream of the turbine 154. The turbine 154 is configured to convert energy in the exhaust gas flow into rotational energy transferred to the compressor via the shaft 156. In this way, energy in the exhaust gas can be recovered and used to provide boost to the engine 10. It will be appreciated that the turbine 154 may include a rotor 155.

A turbine bypass conduit 162 includes an inlet 164 upstream of the turbine inlet 158 and an outlet 166 downstream of the turbine outlet 160. It will be appreciated that the turbine bypass conduit 162 may be routed through a portion of the turbine 154. Thus, the turbine bypass conduit 162 may be integrated into the turbine 154 (e.g., turbine housing). However in other examples, the turbine bypass conduit 162 may be spaced away from the turbine 154.

A turbocharger wastegate 170 is coupled to the turbine bypass conduit 162. The turbocharger wastegate 170 is actuatable in an open configuration and a closed configuration. In one example, the open configuration may be fully open, and the closed configuration may be closed and fully sealed. In the open configuration exhaust gases are permitted to flow through the turbine bypass conduit 162 and in the closed configuration exhaust gasses are inhibited from flowing through the turbine bypass conduit 162. It will be appreciated that the wastegate 170 may be actuatable in a plurality of open configurations each configuration providing a different exhaust gas flowrate through the turbine bypass conduit. The turbocharger wastegate 170 is described in greater detail herein with regard to FIGS. 2-4.

To enable actuation of the wastegate, the turbocharger wastegate 170 is coupled to actuation linkage 172, depicted in FIG. 1 via an arrow. It will be appreciated that the actuation linkage 172 has additional complexity discussed in greater detail herein. Additionally, the actuation linkage 172 may be coupled to an actuator 174. The actuator 174 may be for example, a solenoid valve. The actuator 174 is in electronic communication with the controller 12. Therefore, the controller 12 may be configured to initiate opening and closing of the turbocharger wastegate 170. Specifically, in one example, the controller 12 may be configured to open and close the turbocharger wastegate 170 based on engine operating conditions (e.g., engine speed and/or engine load).

It will be appreciated that the turbocharger wastegate 170 may experience turbulent exhaust gas flow and pressure pulsations during engine operation. Specifically in one example, the pressure pulsations may act on the valve and oscillate the valve within the valve's clearances. Therefore, the turbocharger wastegate 170 has been designed to reduce wastegate chatter caused by the turbulence and/or pressure pulsations. Specifically, a vibration-dampening extension is included in the turbocharger wastegate.

FIGS. 2-4 show several views of a portion of the turbocharger system 150 including the turbocharger wastegate 170. FIG. 2 shows a portion of the turbocharger system 150 including the turbocharger wastegate 170 in a closed position in which a cover plate 200 inhibits exhaust gas flow through the turbine bypass conduit 162, shown in FIG. 3. In the example depicted in FIG. 2, the cover plate 200 is seated and sealed on a turbine bypass conduit flange 300, shown in FIG. 3. Additionally, the cover plate 200 does not extend radially beyond a radial periphery 301 of the flange 300, shown in FIG. 3, when the wastegate is in the closed position shown in FIG. 2. However, a vibration-dampening extension 204 extends radially beyond the turbine bypass conduit flange 300, when the wastegate is in the closed position. Specifically, the vibration-dampening extension 204 includes a first section 205 extending beyond the radial periphery of the cover plate 200 and a second section 207 in front of the cover plate with regard to viewing perspective in FIG. 2. It will be appreciated that the second section 207 may be coupled (e.g., welded) to the cover plate 200.

Continuing with FIG. 2, it will be appreciated that the turbocharger wastegate 170 is positioned at the turbine bypass conduit outlet 166. However, in other examples the turbocharger wastegate 170 may be positioned in another suitable position in the turbine bypass conduit. The turbine outlet 160 is also shown. The turbine outlet 160 is downstream of the turbine rotor 155 (e.g., turbine wheel). The turbine outlet 160 may be referred to as a turbine wheel outlet. It will be appreciated that the turbine outlet 160 receives exhaust gas from the turbine rotor 155 during turbocharger operation.

The turbine outlet 160 may be offset from the cover plate 200 in at least one of a radial and an axial direction. However, other relative positions of the turbine outlet and the cover plate have been contemplated. The turbocharger system also includes a turbine flange 202. It will be appreciated that the turbine flange 202 may be coupled to an exhaust passage upstream of the emission control device 70, shown in FIG. 1, or another suitable exhaust passage, conduit, manifold, etc.

The vibration-dampening extension 204 is coupled (e.g., fixedly) to the cover plate 200. The vibration-dampening extension 204 radially extends beyond a radial periphery 206 of the cover plate 200. Specifically, as shown in FIG. 2 the vibration-dampening extension 204 extends into an exhaust gas flow from the turbine outlet 160 when the turbocharger wastegate 170 is in a closed position and/or a partially open position. A partially open position may be a wastegate configuration in which the cover plate 200 is spaced away from a turbine bypass conduit flange 300, shown in FIG. 3, but obstructing (e.g., partially obstructing) exhaust gas flow exiting the turbine bypass conduit 162, shown in FIG. 3. Therefore, when the wastegate is in a partially open position a portion of the exhaust gas from the cylinder(s) may flow through the turbine and a portion of the exhaust gas from the cylinder(s) may flow through the turbine bypass conduit. Additionally in some examples, in a fully open position the substantial majority of the exhaust gas from the cylinder(s) may flow through the turbine bypass conduit.

Figures 7, 8:
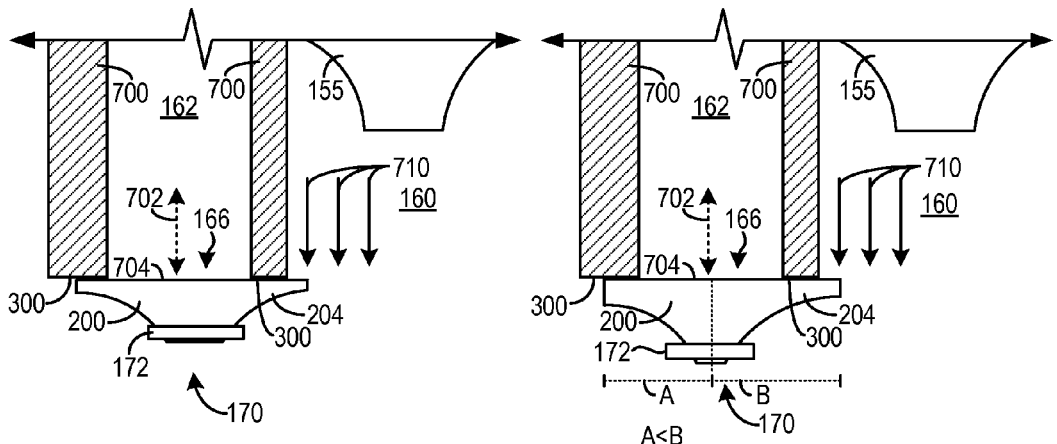
FIGS. 7-9 show cross-sectional views of additional example turbocharger wastegates.
Figure 9:
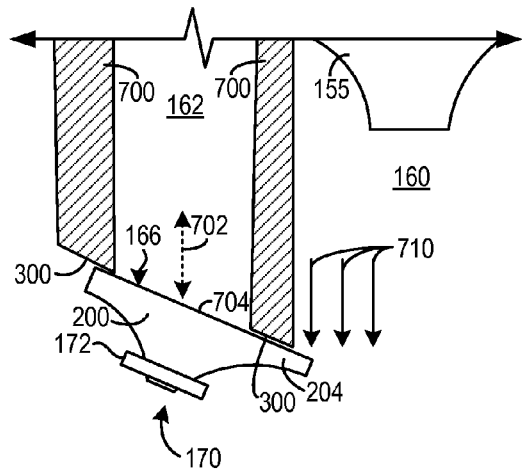

Continuing with FIG. 2, in some examples, the cover plate 200 and the vibration-dampening extension 204 may form a single continuous piece of material as shown in FIGS. 7-9 discussed in greater detail herein. Additionally, the vibration-dampening extension 204 may be welded to the cover plate 200.

The actuation linkage 172 is also depicted in FIG. 2. The actuation linkage 172 is coupled to a central portion of the cover plate 200, in the depicted example. However, other actuation linkage configurations have been contemplated. A central point 208 of the cover plate 200 is shown. The actuation linkage 172 includes a rotational shaft 210. The cover plate 200 and the vibration-dampening extension 204 pivot about the rotational shaft 210, thereby enabling the wastegate to be adjusted into an open or closed configuration. The rotational shaft 210 may be parallel to the turbine bypass conduit flange 300, shown in FIG. 3. Continuing with FIG. 2, the vibration-dampening extension 204 is positioned between the cover plate 200 and the actuation linkage 172. However, other relative positions of the vibration-dampening extension, cover plate, and/or actuation linkage have been contemplated. Additionally, the cover plate 200 may be spring loaded via the actuation linkage 172, in some examples. However, in other examples the actuation linkage may be loaded by an electric motor.

FIG. 3 shows a portion of the turbocharger system 150 including the turbocharger wastegate 170 in an open position where exhaust gas flow is permitted through the turbine bypass conduit 162. It will be appreciated that the open position reduces the amount of boost provided to the engine via a reduction in the amount of exhaust gas flow provided to the turbine. As shown, the cover plate 200 is spaced away from the turbine bypass conduit flange 300, thereby permitting exhaust gas flow through the bypass. Specifically, the cover plate 200 opens in a downstream direction. However, other directions of cover plate opening/closing have been contemplated. The turbine bypass conduit flange 300 is planar in the depicted example. However, other turbine bypass conduit flange contours have been contemplated.

The vibration-dampening extension 204 reduces vibration and audible noise generated by the turbocharger wastegate 170 when the wastegate is in an open position and permitting exhaust gas flow through the turbine bypass conduit 162. The vibration-dampening extension 204 imparts a side-force on the cover plate 200. It has been found unexpectedly that the side-force dampens vibrations of the wastegate. It will be appreciated that the side-force may oppose a spring force imparted on the cover plate 200 via the actuation linkage 172. In one example, the spring force of the cover plate 200 may be increased to account for the side-force on the cover plate, if desired.

In some examples, the actuator 174, shown in FIG. 1, may be configured to position the wastegate 170 in a plurality of open positions permitting different flowrates of exhaust gas through turbine and turbine bypass conduit 162. Thus, the cover plate 200 and the vibration-dampening extension 204 may be positioned at different angular positions with regard to the rotational shaft 210 to achieve these degrees of openings and exhaust gas flowrates. However, it will be appreciated that in other examples other types of actuation linkage may be used to achieve similar opening adjustment functionality.

FIG. 4 shows another view of the turbocharger system 150 including the turbocharger wastegate 170 in an open position. The turbine rotor has been omitted from FIG. 4. However, it will be appreciated that the turbine includes a rotor. The cover plate 200, vibration-dampening extension 204, and the turbine outlet 160 are shown in FIG. 4. A turbine volute 400 is also depicted in FIG. 4.

FIG. 5 shows a turbocharger wastegate 170 including the cover plate 200, the vibration-dampening extension 204, and the actuation linkage 172. As shown, the vibration-dampening extension 204 is annular therefore the vibration-dampening extension may be referred to as an annular vibration-dampening extension, in some examples. However, other vibration-dampening extension geometries have been contemplated.

Additionally, the vibration-dampening extension 204 may be asymmetrically positioned radially with regard to the cover plate 200 in one example, such that it does not cover some portions of the cover plate and does not extend into exhaust gas flow over a radial portion of the cover plate. As shown, section 501 of the cover plate 200 is not covered by the vibration-dampening extension 204. The second section 207 of the vibration-dampening extension 204 covers a portion of the cover plate 200 while the first section 205 of the vibration-dampening extension 204 extends beyond the cover portion 200 into an exhaust gas flow downstream of the turbine rotor. Thus, the cover plate 200 is not behind the first section 205 as viewed in FIG. 5. It will be appreciated that the first section 205 extends into the exhaust gas flow downstream of the turbine rotor when the wastegate 170 is in a closed position.

Furthermore, the thickness of the vibration-dampening extension 204 may also increase in a radial direction, in some examples. However, in other examples the thickness of the vibration-dampening extension 204 may be substantially uniform. An outer edge 502 of the extension is curved. In the depicted example, the radius of the outer edge 502 with regard to the central point 208 remains substantially constant. However, in other examples the radius of the outer edge may vary along its length.

The vibration-dampening extension 204 is semi-annular in shape, in the depicted example. However, other vibration-dampening extension geometries have been contemplated. In one example, the vibration-dampening extension 204 may extend 180° or less around the cover plate 202. However, in other examples the vibration-dampening extension 204 may extend from 1° to 180°. Further in some examples, the geometry of the vibration-dampening extension and the cover plate may be uniform around the circumference of the shape with the amount of exposed extension or overhang being established by the mating casting design. The vibration-dampening extension 204 may have a curved radial edge, in some examples. The curved radial edge may decrease manufacturing costs and increase the durability of the vibration-dampening extension 204. However, in other examples the vibration-dampening extension 204 may have a rectangular or oval shaped edge.

FIG. 6 shows a method 600 for operating a turbocharger wastegate in an engine. The method 600 may be implemented by the engine, systems, components, etc., described above with regard to FIGS. 1-5 or may be implemented by another suitable engine, systems, and components.

At 602 the method includes operating the turbocharger wastegate based on engine operation conditions. Operating the wastegate based on engine operating conditions may include at 604 adjusting the wastegate position based on at least one of engine load and engine speed. For example, the wastegate may be opened/closed in response to a change in engine load and/or engine power output. In some examples, adjusting the adjusting the wastegate position may include rotating the wastegate about a rotational shaft coupled to the cover plate.

At 606 the method includes imparting a side-force on a portion of a cover plate in the wastegate via a vibration-dampening extension. In some examples, the side-force opposes a spring force imparted on the cover plate by an actuation linkage. Further in some examples, where imparting the side-force occurs when the wastegate is in an open position and exhaust gas is flowing through a turbine bypass conduit. As discussed above, the turbocharger wastegate may be coupled to the turbine bypass conduit and in some examples may be coupled to the inlet of the turbine bypass conduit. Still further in some examples, the side-force may be a moment of force about a rotational axis defined the actuation linkage.

FIGS. 7-9 show cross-sectional views of additional example turbocharger wastegates. The cover plate and vibration-dampening extension shown in FIGS. 7-9 form a continuous piece of material. Thus, the vibration-dampening extension is integrated into the cover plate. Specifically in one example, the cover plate and the vibration-dampening extension may be formed via a single casting.

In FIG. 7 the cover plate 200 and the vibration-dampening extension 204 included in the turbocharger wastegate 170 are shown with additional details. A portion of the actuation linkage 172 is also shown. The cover plate 200 and the vibration-dampening extension are offset with respect the turbine bypass conduit flange 300 to provide unequal overhang. The offset enables a side force to be imparted on the cover plate 200 and vibration-dampening extension 204. The cover plate 200 and the vibration-dampening extension 204 are symmetric in the example depicted in FIG. 7. However, the cover plate 200 and the vibration-dampening extension 204 may be asymmetric in other examples.

The turbine rotor 155 (e.g., turbine wheel) is also shown. Arrows 710 depict the general direction of exhaust gas flow through the turbine outlet 160. It will be appreciated that the exhaust gas flow through the turbine outlet 160 may impart a side force on the cover plate 200 and the vibration-dampening extension 204. As previously discussed, the side force reduces the wastegate chatter.

The side force may not only be imparted on the cover plate 200 and the vibration-dampening extension 204 in the closed configuration shown in FIG. 7 but also in a partially open configuration where the cover plate 200 is spaced away from the turbine bypass conduit flange 300 and impeding (e.g., partially impeding) exhaust gas flowing from the outlet 166 of the turbine bypass conduit 162.

A housing 700 of the turbine bypass conduit 162 is also shown. A central axis 702 of an outlet 166 of the turbine bypass conduit 162 is perpendicular a leading side 704 of the cover plate 200 when the wastegate is in a closed position. However, other angles have been contemplated. The leading side 704 of the cover plate 200 is planar in the depicted example. However, other geometries have been contemplated.

FIG. 8 shows another example turbocharger wastegate 170 including a cover plate 200 and the vibration-dampening extension 204. The housing 700 of the turbine bypass conduit 162 is shown along with the turbine rotor 155 and the turbine outlet 160.

The general direction of exhaust gas flow in the turbine outlet 160 denoted via arrows 710 is also shown. The cover plate 200 and the vibration-dampening extension 204 are asymmetric about at least one axis in the example depicted in FIG. 8. Specifically, length A is less than length B. The asymmetry of the cover plate 200 and the vibration-dampening extension 204 enables the vibration-dampening extension 204 to extend into the exhaust gas flow exiting the turbine rotor 155 in a closed position and a partially open position where the cover plate 200 is spaced away from the turbine bypass conduit flange 300 and partially obstructing exhaust gas flow exiting the turbine bypass conduit 162. As a result, a side force is imparted on the cover plate and vibration-dampening extension, thereby reducing wastegate vibration, as discussed above. The central axis 702 of the outlet 166 is again perpendicular to the leading side 704 of the cover plate 200 when the wastegate is in the closed position in FIG. 8. However, other relative orientations have been contemplated. A portion of the actuation linkage 172 coupled to the cover plate 200 and the vibration-dampening extension 204 is also shown in FIG. 8.

FIG. 9 shows another example turbocharger wastegate 170 including a cover plate 200 and the vibration-dampening extension 204. The housing 700 of the turbine bypass conduit 162 is shown along with the turbine rotor 155 and the turbine outlet 160. Again, the cover plate 200 and the vibration-dampening extension 204 are asymmetric about at least one axis in FIG. 9. Furthermore, the central axis 702 of the outlet 166 of the turbine bypass conduit 162 intersects the leading side 704 of the cover plate 200 at a non-perpendicular angle when the wastegate is in a closed position. That is to say that the angle formed between the intersection of the central axis and the leading side is less than or greater than 90 degrees when the wastegate is in a closed position and substantially inhibiting exhaust gas flow through the turbine bypass conduit. The general direction of exhaust gas flow in the turbine outlet 160 denoted via arrows 710 is also shown. Again, the exhaust gas flowing from the turbine rotor 155 imparts a side force on the cover plate 200 and vibration-dampening extension 204 in a closed configuration and a partially open configuration where the cover plate 200 is spaced away from the turbine bypass conduit flange 300. A portion of the actuation linkage 172 coupled to the cover plate 200 and vibration-dampening extension is also shown in FIG. 8.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger system of an internal combustion engine comprising:
 a wastegate having a cover plate actuatable in open and closed positions, the open position enabling exhaust gas flow through a turbine bypass conduit and the closed position inhibiting exhaust gas flow through the turbine bypass conduit; and
 a vibration-dampening extension of the wastegate fixedly coupled to the cover plate, radially extending beyond a radial periphery of the cover plate, and having semi-annular shape with a uniform thickness, where the vibration-dampening extension extends into an exhaust gas flow from a turbine outlet when the cover plate is seated and sealed in the turbine bypass conduit and in a partially open configuration where the cover plate is spaced away from a turbine bypass conduit flange and impeding exhaust gas flow exiting the turbine bypass conduit.

2. The turbocharger system of claim 1, wherein in a closed position when the cover plate is seated and sealed on the turbine bypass conduit flange, the cover plate does not extend radially beyond a radial periphery of the flange and the vibration-dampening extension extends radially beyond the radial periphery of the flange.

3. The turbocharger system of claim 1, where the turbine outlet is offset from the cover plate in at least one of a radial and an axial direction.

4. The turbocharger system of claim 1, further comprising an actuation linkage coupled to the vibration-dampening extension.

5. The turbocharger system of claim 4, where the vibration-dampening extension is positioned between the cover plate and the actuation linkage.

6. The turbocharger system of claim 4, where the actuation linkage is coupled to a central portion of the cover plate.

7. A turbocharger system of an internal combustion engine comprising:
  a wastegate having an actuatable cover plate coupled to a the turbine bypass conduit; and
  a semi-annular vibration-dampening extension with a uniform thickness of the wastegate fixedly coupled to the cover plate asymmetrically and extending radially beyond the cover plate, and into an engine exhaust gas flow turbine outlet when the cover plate is in a closed position inhibiting the engine exhaust gas flow through the turbine bypass conduit.

8. The turbocharger system of claim 7, where the semi-annular vibration-dampening extension extends only 180° or less around the cover plate.

9. The turbocharger system of claim 7, where the semi-annular vibration-dampening extension extends between 1° and 180° around the cover plate.

10. The turbocharger system of claim 7, where the cover plate is spring loaded via an actuation linkage coupled to the vibration-dampening extension.

11. The turbocharger system of claim 10, where the cover plate and the semi-annular vibration-dampening extension pivot about a rotational shaft included in the actuation linkage.

12. The turbocharger system of claim 11, where a central axis of an outlet of the turbine bypass conduit is not perpendicular to a leading side of the cover plate when the wastegate is in the closed position.

13. The turbocharger system of claim 7, where the semi-annular vibration-dampening extension has a curved radial edge.

14. The turbocharger system of claim 7, where the cover plate and the vibration-dampening extension form a single continuous piece of material.

15. A method of operating a turbocharger wastegate in an engine comprising:
  determining engine operation conditions;
  operating the turbocharger wastegate based on the engine operation conditions being determined; and
  imparting a side-force on a portion of a cover plate in the wastegate via radial extension of a semi-annular vibration-dampening extension with a uniform thickness beyond the cover plate and into an exhaust gas flow exiting a rotor of a turbine of the turbocharger, the vibration-dampening extension positioned between the cover plate and an actuation linkage, during the operating the wastegate.

16. The method of claim 15, where the side-force opposes a force imparted on the cover plate by the actuation linkage.

17. The method of claim 15, where imparting the side-force occurs when the wastegate is in a closed position or an open position when the wastegate is obstructing a portion of an exhaust flow exiting a turbine bypass conduit.

18. The method of claim 15, where operating the wastegate includes rotating the wastegate about a rotational shaft coupled to the cover plate.

19. The method of claim 15, where operating the wastegate based on the engine operation conditions being determined includes adjusting a wastegate position based on engine load.

* * * * *

UNITED STATES PATENT AND TRADEMARK OFFICE
CERTIFICATE OF CORRECTION

PATENT NO. : 9,464,563 B2  Page 1 of 1
APPLICATION NO. : 13/706252
DATED : October 11, 2016
INVENTOR(S) : Alan Eden et al.

It is certified that error appears in the above-identified patent and that said Letters Patent is hereby corrected as shown below:

In the Claims

Column 11, Line 25, Claim 7, delete "the" immediately before "turbine bypass conduit".

Signed and Sealed this
Third Day of January, 2017

Michelle K. Lee
*Director of the United States Patent and Trademark Office*